Patented June 6, 1944

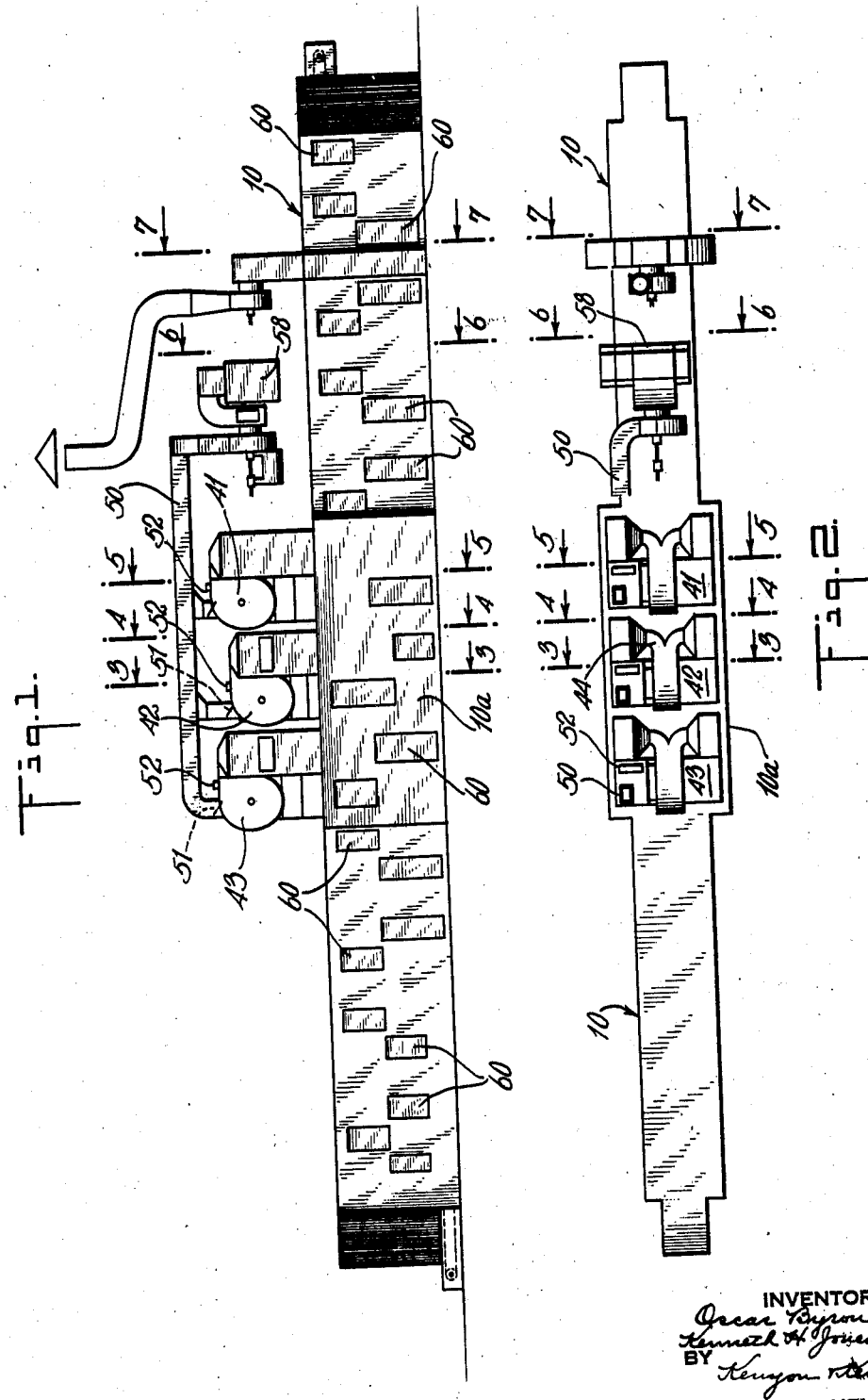

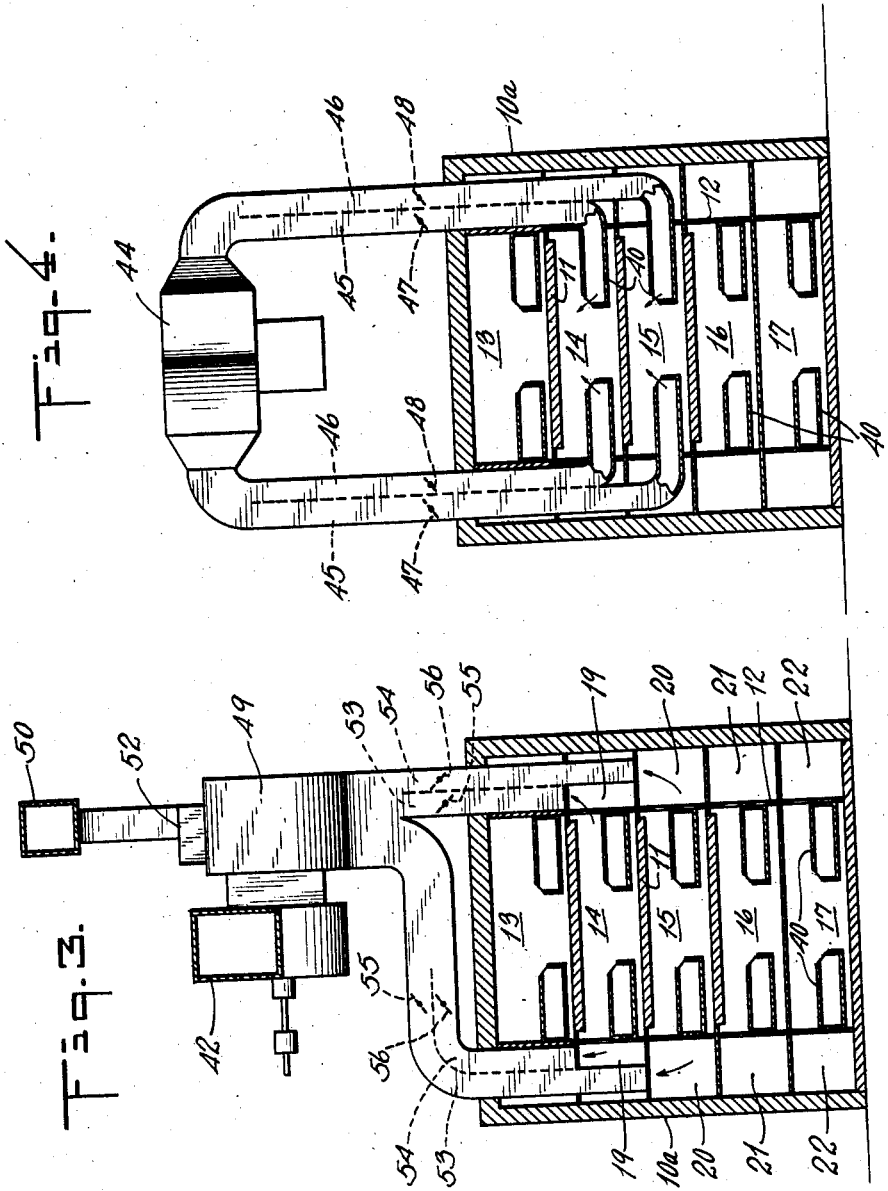

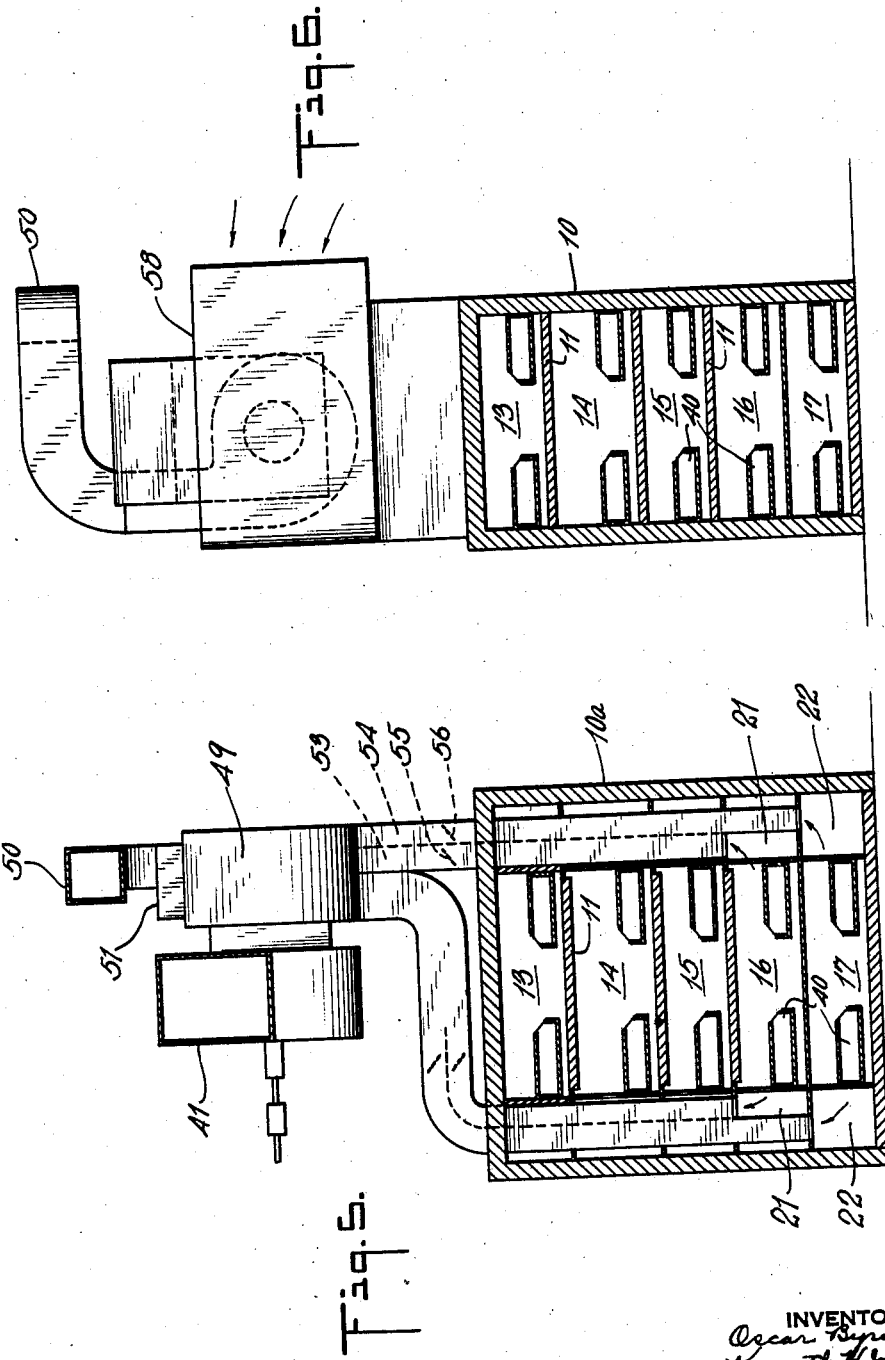

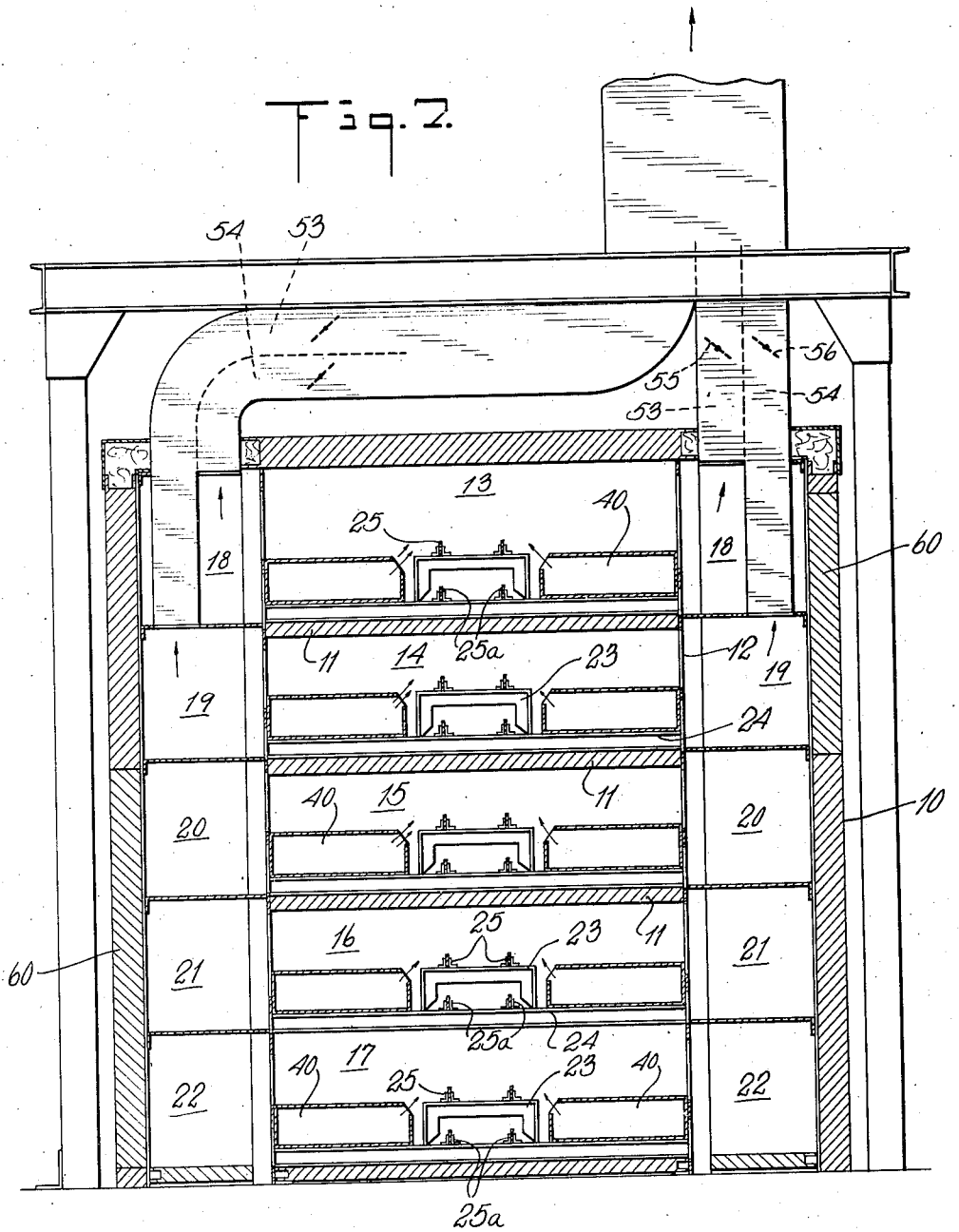

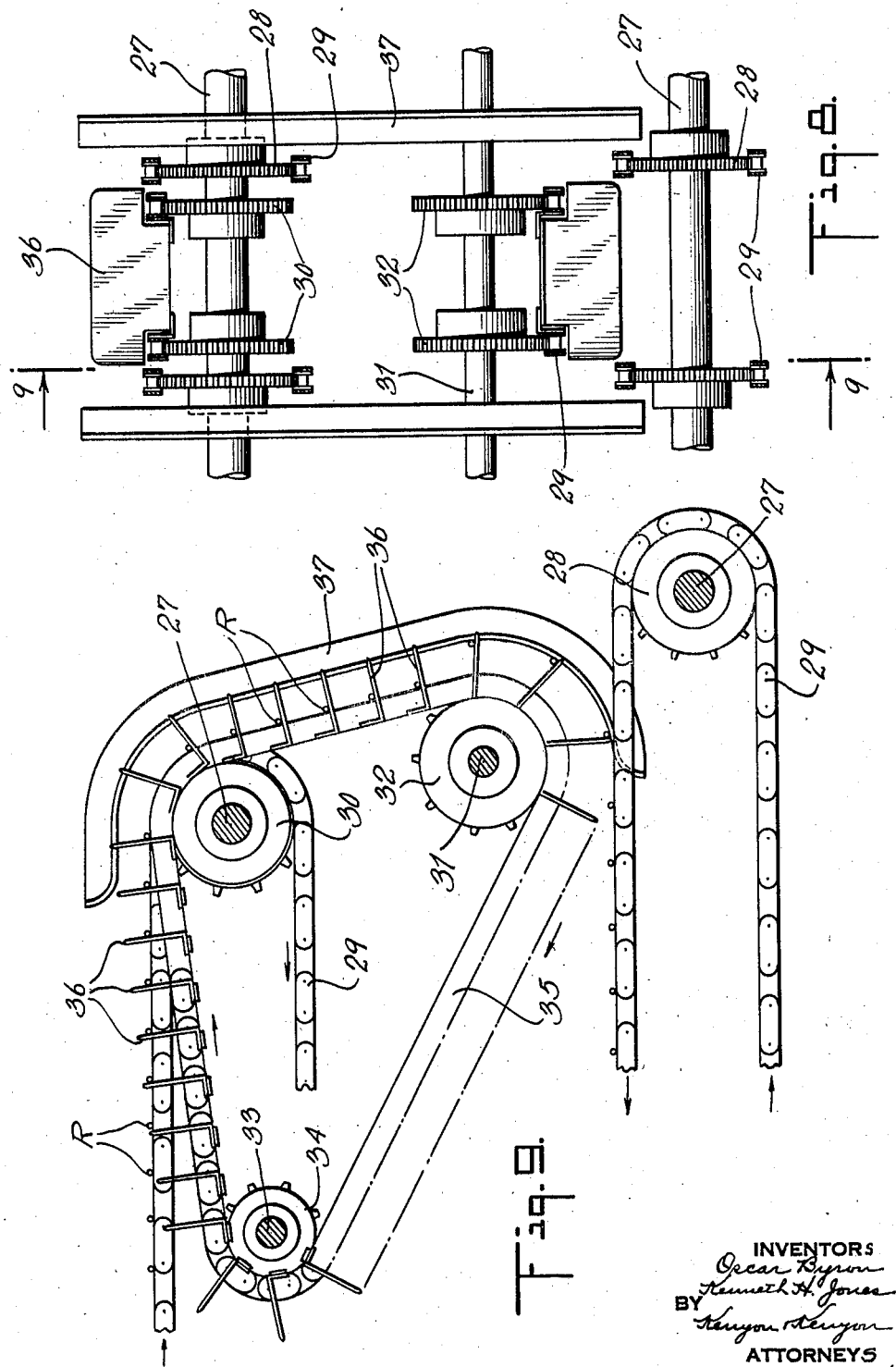

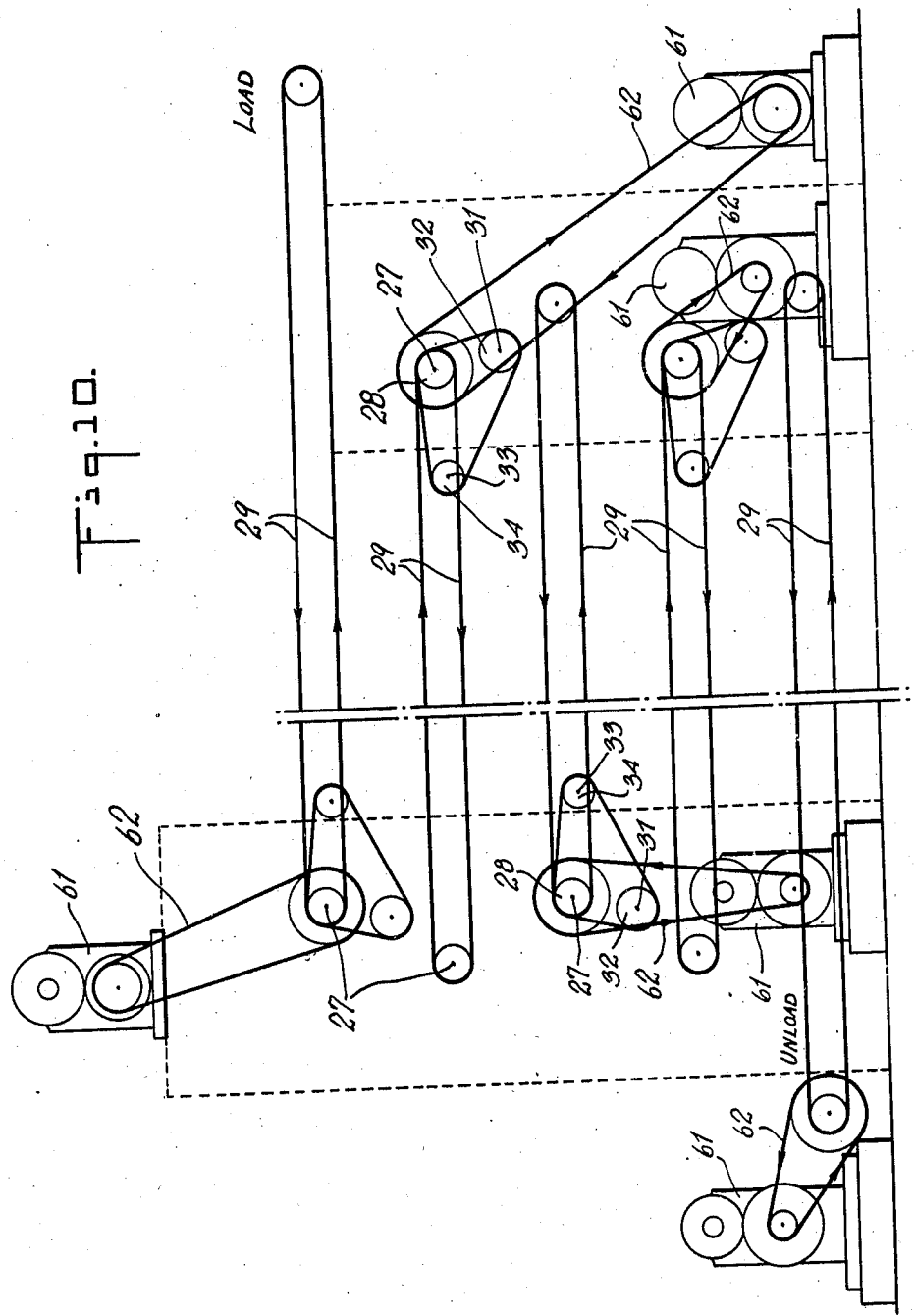

2,350,672

UNITED STATES PATENT OFFICE 2,350,672

DRIER

Oscar Byron, New York, and Kenneth H. Jones, Hollis, N. Y., assignors to J. O. Ross Engineering Corporation, New York, N. Y., a corporation of New York Application August 5, 1942, Serial No. 453,622

7 Claims. (Cl. 34—203)

This invention relates to driers.

In the manufacture of coated welding rods or electrodes, the rods must be treated in an oven to dry out a certain amount of moisture and, in some instances, to produce a physical and chemical change in the coating. The use to which the electrode is to be put, that is, the form of subsequent weld that is required determines the nature of the type of coating placed thereon. Each coating requires different conditions of drying or baking which involve time, temperatures and atmospheric control within the baking medium. For example, certain types of coatings require a greater initial humidity condition for a longer space of time in the dryer than others while some types of coating require little or no humidity in the initial stages of drying.

An object of this invention is a drying oven which can take care of the variables above mentioned and will process all types of electrodes at high speed while requiring a minimum amount of floor space.

Former designs of equipment for this type of work consisted of a single tunnel-type drier or multiples thereof placed in line through which the electrodes, on some conveying means, were caused to travel. Zones of control either were not adequately provided for or were accomplished by a distinct separation of the tunnel units. A subsequent modification of this arrangement in order to save floor space involved superposing two or more tunnels so that at least two lines of travel were formed with a means of transfer from an upper line of travel to a lower. This arrangement had its limitations in high cost and lack of ease of accessibility. This latter condition usually limited such an arrangement to two passes of the conveyor. Also, in this arrangement, limitations as to the speed of output for the occupied space of the apparatus developed.

In the present invention, the greatest advantage is taken of floor space and the greatest degree of accessibility is obtained through the new arrangement of multiple pass conveyors and individual zone control systems. Easy accessibility to all parts of the unit is provided and the entire system is enclosed in one complete housing.

In the processing of electrodes, a certain length of time must elapse in each zone of operation in order to accomplish the necessary effect upon the coating. In the initial stages, the rods are wet and consequently soft and easily damaged. Care must be exercised to keep the rods apart until such time as treatment has progressed to the point where contact or movement will no longer mar the coatings. Thereafter, the rods may be placed in contact with each other and further may be directly superposed on each other in two or more layers without harmful effect. To take care of this condition, the conveyors of the present invention are so designed that they may be operated at variable speeds, each conveyor preferably being independently driven and controlled. Variable speed drives permit of changing the conveying speeds at will in order to accomplish the necessary drying cycle in each zone of control within the necesary time limits in each zone and with the maximum output for each zone within the minimum range of the oven.

The oven is designed to provide the zone separation with individual tunnel units superposed on each other in multiple layers to give the advantage of low total height thereby permitting of complete observation of operation and complete accessibility. Unlike former practice, the oven is designed so that each pass is completely separated from the others by means of horizontal dividing insulated partitions. This arrangement not only allows different temperatures to be used in the various passes but prevents a rod from an upper pass falling down into a lower pass should the rod accidently fall off a conveyor.

Means for collecting such rods and subsequent removal from the oven are provided. Each pass may be separated from the other from a standpoint of temperature control and yet the entire system is enclosed within a single housing. At the end of each pass of conveyor, there is provided transferring mechanism which conveys rods from an upper to a lower pass without marring the coating. Such transfer mechanism consists of an independent conveyor driven from the main conveyor in each pass to which are attached specially shaped transfer plates so designed as to pass between the main conveyor chains carrying the rods and, moving at a gradual incline, pick up the rods with the least amount of movement of a rod and therefore with no damage to the coating.

In order to obtain maximum accessibility, the oven is provided with a multiplicity of doors located at both sides of the oven throughout its length and so arranged as to provide ability to service every part of the equipment. In order further to facilitate accessibility to the rods being treated, the oven has a duct system in which the supply ducts of each pass are located on both sides of the conveyor chain and of such height as to permit the top chain to be slightly above the top of the ducts so that the rods may ride on the conveyor with their ends extending over the tops of the ducts. With this arrangement, the complete conveyor full of rods can be seen at all times and is at all times accessible for servicing.

An additional feature of this duct arrangement is the completely free space provided directly below the ducts and the return pass of the conveyor extending the full width and length of each pass so that if a rod should accidently drop between the two chains forming the conveyor, such rod will fall upon the dividing partition below and remain there until such time as cleaning operations are necessary. Removal of fallen rods is accomplished by withdrawing through the side service doors.

Preferably, the conveyor chains are roller chains fitted with straight side bars. Such chains may be of the single strand design or of the so-called "duplex" strand design. The advantage of this type of chain is that it provides a comparatively large bearing surface for the rods to rest on, thereby causing little or no depression on the coating of the so-called soft type of electrode. This is especially important in the initial stages of treatment when the rods are softest. With this type of chain, the rods will remain any place where they are put without possible contact with each other such as might take place with the usual type of chain. This chain also provides easier flow of rods at the transfer points and permits standard lengths and diameters of rods to be handled with equal facility.

The heating system consists of a central source of heat produced by any of the usual means such as gas or oil fuel or electricity, from which air at a temperature somewhat elevated above the maximum operating temperature of the hottest zone is passed into a main feed duct. The temperature of this duct is maintained at a constant level by thermostatic control operating directly on the heat source. From this main duct the necessary amount of hot air is bled into each of a plurality of independent zone circulating systems at a rate automatically controlled by motor-operated dampers actuated by thermostatically controlled instruments placed in each zone of operation. In this way, a completely independent thermostatically controlled circulating system is maintained and changed at will. The heating system also may be arranged for an entirely independent heating system for each zone, this requiring a multiplicity of heating and circulating units for the entire oven. Each such unit will have its own control system with the controls operating directly on the source of heat.

Another feature of the present invention is the inter-changeability of zones of control. For example, in a five-pass oven, the first zone may constitute the first pass or the first pass combined with the second pass. The second zone may constitute either the second pass or the third pass or both, while the third zone may consist of the fourth and fifth passes. The advantage of this arrangement over other types is that the length of time of treatment of the rods may be increased or shortened as desired in accordance with the time elements required for the treatment of the particular rods.

A further feature of the present invention is the arrangement of the flow of air from the supply ducts within each pass or conveyor. Such ducts extend the full length of the oven and because of their arrangement permit of direct impingement of hot air against the rods throughout the full length of travel in the oven without having the duct extending under the rods so as to prevent their dropping into the space below the ducts. In this way, a rapidity of drying or baking is obtained that could not be obtained by the previous design and greater production is thereby accomplished.

Other objects, novel features and advantages of this invention will become apparent from the following specification and accompanying drawings, wherein:

Fig. 1 is a side elevation of a drier embodying the invention;

Fig. 2 is a plan view of Fig. 1;

Figs. 3, 4, 5 and 6 are sections respectively on the lines 3—3, 4—4, 5—5 and 6—6 of Figs. 1 and 2 with details of the conveyor omitted;

Fig. 7 is an enlarged section on the line 7—7 of Figs. 1 and 2;

Fig. 8 is an end view of the transfer mechansim;

Fig. 9 is a section on the line 9—9 of Fig. 8, and

Fig. 10 is a schematic view illustrating the drive mechanism.

The drier consists of a tunnel 10 having walls of heat insulation construction and provided with a plurality of horizontal partitions 11, some of which are in part of heat-insulation construction. This arrangement of partitions provides full length chambers 13, 14, 15, 16 and 17. The tunnel 10 is of greater width over its central portion 10a and in this portion are provided vertical grills 12 forming lateral chambers 18, 19, 20, 21 and 22 along both flanks of the central chambers 13, 14, 15, 16, 17 respectively and communicating therewith. The successive horizontal partitions alternately terminate short of one end of the tunnel thereby forming passageways between successive chambers with the successive passageways being alternately arranged at opposite ends of the tunnel. The ends of the tunnel are closed except for an upper right end opening and a lower left end opening.

A frame 23 is supported in each central chamber by angle bars 24 spaced slightly above the horizontal partition 11 at each end of the oven. On the upper surface of each frame 23 are mounted two tracks 25 and similar tracks 25a are mounted directly below the tracks 25. At the end of each central chamber is rotatably mounted a shaft 27 equipped with a pair of sprocket wheels 28. The right end shafts 27 of chambers 14 and 16 are arranged inwardly of the right end shafts 27 of chambers 15 and 17 while the left end shafts 27 of chambers 13 and 15 are arranged inwardly of the left end shafts 27 of chambers 14 and 16. Two endless roller chains 29 of the straight-side bar type are trained around the sprocket wheels for each chamber to form a conveyor having its upper reach guided by the tracks 25 and its lower reach guided by the tracks 25a. At the left end of chamber 13, right end of chamber 14, left end of chamber 15 and right end of chamber 16, the corresponding shaft 27 is provided with an additional pair of sprockets 30 arranged between the sprockets 28. Also, an additional shaft 31 is located slightly above the upper reach of the conveyor for the next lower central chamber and is provided with a pair of sprocket wheels 32. A third shaft 33 extends between the reaches of the upper chamber conveyor and is provided with a pair of sprocket wheels 34. A roller chain 35 of the straight side bar type passes around each set of sprocket wheels 30, 32 and 34 and together, the two chains 35 constitute a conveyor which is provided with a plurality of outwardly extending plates 36. Two angle guide members 37 are arranged exteriorly of the sprocket wheels 28 with one surface of each angle member being in alinement with the path traversed by a point slightly spaced inwardly from the end of each plate 36 during its travel part-way around the sprocket wheel 28 and down to and part-way around the sprocket wheel 32, the ends of each guide 37 being curved to lie out of alinement with the path of the edges of the plates 36.

The mechanism just described constitutes mechanism for transferring rods from one conveyor to the next lower conveyor. By reference to Fig. 10, it will be seen that as the rods on the upper reach of the upper conveyor approach the sprocket wheels 28, the plates 36 are projected between successive rods and support the rods as they leave the conveyor when the latter passes around the sprocket wheels 28. The plates 36 support the rods R until the blades begin to swing around the sprockets 32 whereupon the rods are moved by gravity into contact with the guides 37 by which they are delivered to the upper reach of the next lower conveyor.

In each chamber, a duct 40 is supported by the bars 24 along each side of the frame 23 and each duct is provided at its upper inner corner with outlets by means of which air is discharged from the duct into direct contact with rods supported by the chain 29. At spaced locations along the wide portion 10a of the tunnel are provided blowers 41, 42 and 43 by means of which drying air is supplied to the ducts 40. As the supply arrangement for each blower is the same, only one will be described in detail.

Each blower discharges into a laterally arranged header 44 which is provided at each end with two conduits 45 and 46 of which 45 leads to a duct 40 in one chamber while the conduit 46 leads to a duct 40 in the next lower chamber and in the conduits are provided dampers 47 and 48 respectively. The blower 41 supplies chambers 13 and 14, blower 42 supplies chambers 14 and 15 and blower 43 supplies chambers 16 and 17.

Each blower receives air of predetermined temperature from a mixing box 49 to which hot air is supplied through a conduit 50 controlled by a damper 51 and which has an inlet 52 for atmospheric air. Conduits 53 and 54 communicate with the mixing box 49, of which 53 leads from one lateral chamber and the conduit 54 leads from the next lower lateral chamber, the conduits being provided with dampers 55 and 56. Each lateral chamber communicates with the corresponding central chamber so that each conduit conveys air from a central chamber to a mixing box. Preferably, the arrangement of the conduits 53 and 55 corresponds to the arrangement of the conduits 45 and 46 so that air supplied by the blower to a chamber is returned to the mixing box for that blower.

Hot air is supplied to the conduit 50 from a heating system 58, the particular structure of which forms no part of this invention and therefore is not described in detail. Each damper 51 is controlled by one or more thermostats arranged in the various chambers so that the temperature of the air in any chamber may be maintained constant.

The conduits leading from the blowers to the ducts 40 and from the lateral chambers to the mixing boxes 49 are so arranged that the chamber 13 by itself or in combination with the chamber 14 may constitute a first treating zone, that either the chamber 14 or the chamber 15 or both chambers together may constitute a second treating zone while chambers 16 and 17 may constitute a third treating zone. As shown in Fig. 3, conduits 53 and 54 lead from lateral chambers 19 and 20 to one mixing box 49 while as shown in Fig. 7 other conduits 53 and 54 lead from lateral chambers 18 and 19 to another mixing box. Also, as shown in Fig. 4, conduits 45 and 46 lead from header 44 to the ducts 40 of chambers 14 and 15. As previously described, other ducts lead from another header 44 to the ducts of chambers 13 and 14 while still another set of conduits 45 and 46 lead from a third header 44 to the ducts of chambers 16 and 17. Thus, by proper manipulation of the dampers 47, 48, 55 and 56, numerous different arrangements of zones may be effected.

At either end of the tunnel, exhaust mechanism is provided for withdrawing gases from the oven. As these mechanisms involve no particular novelty they are not herein described in detail. Numerous access doors 60 are provided in the lateral walls of the oven and are suitably arranged to afford the highest degree of accessibility. The doors are suitably insulated to prevent unnecessary loss of heat.

The outlets from each duct 40 are so arranged as to provide an oblique air stream and horizontal air stream. This arrangement insures uniform supply of air over the entire length of the welding rods.

A separate source of power 61 is provided for each of the conveyors 29 and power is transmitted from the source 61 to the conveyor by means of the belt or chain 62. With this arrangement, the speed of the various conveyors may be independently regulated so that the length of travel time of a welding rod in the different zones may be varied as desired.

It is of course understood that various modifications may be made in the structure herein disclosed without in any way departing from the spirit of the invention as defined in the appended claims.

We claim:

1. A drier comprising a tunnel oven having a plurality of horizontal partitions forming longitudinal chambers, a conveyor extending longitudinally of each chamber, a duct in each chamber having a discharge aperture for supplying air to materials supported by said conveyor, a plurality of heated air suppliers, conduits for conveying air from each supplier to the ducts of at least a pair of chambers with two suppliers being arranged to furnish air to the same chamber, a damper for each conduit, and means for returning air from at least two chambers to each supplier.

2. A drier comprising a tunnel oven having a plurality of horizontal partitions forming longitudinal chambers, a conveyor extending longitudinally of each chamber, a duct in each chamber having a discharge aperture for supplying air to materials supported by said conveyor, a plurality of heated air suppliers, conduits for conveying air from each supplier to the ducts of at least a pair of chambers with two suppliers being arranged to furnish air to the same chamber, a damper for each conduit, and conduits for returning air from each chamber to the same supplier from which heated air was conveyed thereto.

3. A drier comprising a tunnel oven having a plurality of horizontal partitions forming longitudinal chambers, a conveyor extending longitudinally of each chamber, a duct in each chamber having a discharge aperture for supplying air to materials supported by said conveyor, a plurality of heated air suppliers, damper-controlled conduits for selectively conveying air from each supplier to the ducts of at least a pair of chambers with two suppliers being arranged to furnish air to the same chamber, and conduits for returning air from each chamber to the same supplier from which heated air was conveyed thereto.

4. A drier comprising a tunnel oven having a plurality of horizontal partitions forming longitudinal chambers, a conveyor extending longitudinally of each chamber, a duct in each chamber having a discharge aperture for supplying air to materials supported by said conveyor, a plurality of heated air suppliers, conduits for conveying air from each supplier to the ducts of at least a pair of chambers with two suppliers being arranged to furnish air to the same chamber, a damper for each conduit, means for returning air from at least two chambers to each supplier, and means at one end of a chamber for automatically transferring material from one conveyor to the next lower conveyor.

5. In combination, a pair of superposed horizontally arranged conveyors, each conveyor consisting of two roller chains supported by sprocket wheels, a third conveyor consisting of two roller chains supported by three pairs of sprocket wheels of which one pair is coaxial with one pair of sprocket wheels of the upper conveyor and a second pair is arranged between the two conveyors while the remaining pair is located between the upper and lower reaches of the upper conveyor whereby a reach of the third conveyor approaches the upper reach of the upper conveyor at a slight inclination, spaced outwardly extending blades carried by said third conveyor, and guide means arranged to be engaged by material supported by said blades to direct said material to said lower conveyor.

6. A drier comprising a tunnel oven having a horizontal partition, an endless conveyor extending longitudinally of the oven and having two spaced reaches at different elevations with respect to said partitions, a duct extending along each side of said conveyor with the duct bottom spaced from said partition and the duct top at a slightly lower elevation than the top reach of the conveyor to provide clear space below the conveyor the full width of the partition, discharge apertures in said ducts for directing air horizontally and obliquely toward the center of the conveyor, and means for supplying heated air to said ducts.

7. A drier according to claim 6 characterized by a multiplicity of access doors in at least one of the side walls for facilitating removal of material that may have fallen into the space below the lower reach of said conveyor.

OSCAR BYRON.
KENNETH H. JONES.